Patented Nov. 2, 1948

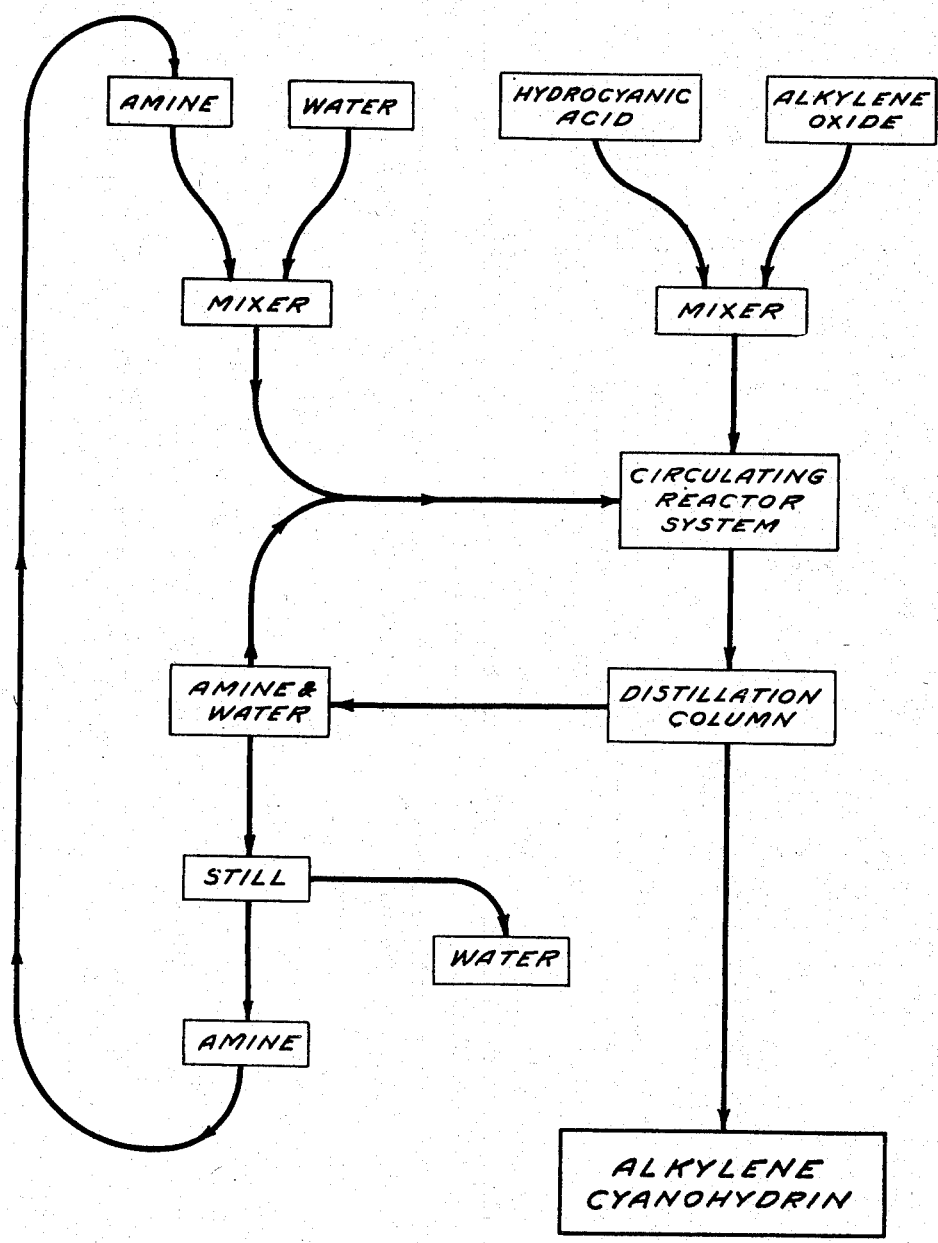

2,453,062

UNITED STATES PATENT OFFICE 2,453,062

PRODUCTION OF ALKYLENE CYANOHYDRINS

Erwin L. Carpenter, Stamford, Conn., assignor to American Cyanamid Company, New York, N. Y., a corporation of Maine Application June 4, 1946, Serial No. 674,199

8 Claims. (Cl. 260—465.6)

The present invention relates to the production of alkylene cyanohydrins, and more particularly to an improved method for the preparation of an alkylene cyanohydrin from the corresponding alkylene oxide and hydrocyanic acid.

It is well known that alkylene cyanohydrins may be obtained by reacting alkylene oxides with dispersions of alkaline earth metal cyanides in aqueous solvents. Thus, for example, by bringing together ethylene oxide and an aqueous solution of calcium cyanide, ethylene cyanohydrin is formed with the separation of calcium hydroxide. It is also possible, instead of starting with the alkaline earth metal cyanide, to employ the corresponding hydroxide in an aqueous suspension and to convert it first into the cyanide by leading in hydrocyanic acid. Removal of the large quantity of alkaline earth metal hydroxide from the aqueous alkylene cyanohydrin solution by filtration is a slow, cumbersome step, and in addition considerable washing of the filter cake is necessary to avoid substantial loss of the cyanohydrin. Further removal of residual alkaline earth metal hydroxide from the aqueous alkylene cyanohydrin solution is accomplished by passing in carbon dioxide and thereafter filtering off the precipitated carbonate. The cyanohydrin is then recovered from the aqueous solution by evaporating off the water, followed by fractionation in the usual manner.

Organic amines have been considered as catalysts for the reaction of alkylene oxides with hydrocyanic acid. The amines are expensive compounds, and hence it is essential that they be recovered, particularly in a commercial process.

It would, therefore, be highly desirable to operate a process for the production of alkylene cyanohydrins in which a volatile amine is employed as the catalyst in aqueous solution wherein, after the reaction of the alkylene oxide with the hydrocyanic acid is completed, the amine could be removed by distillation along with the water forerun.

Many of the simple aliphatic amines which are normally volatile such as, for example, n-butyl amine, di-n-propyl amine, triethyl amine and the like, when employed as catalysts for the reaction of an alkylene oxide with hydrocyanic acid in aqueous solution, initially react with the alkylene oxide and water to form quaternary ammonium hydroxide compounds. Such quaternary bases, although they function somewhat as catalysts for the reaction, are non-volatile and very strongly basic, and consequently decompose the alkylene cyanohydrin at a rapid rate.

There has now been discovered a certain class of amines which do not react with alkylene oxides in aqueous solution to form quaternary bases. Such amines can be employed as catalysts for the reaction of an alkylene oxide with hydrocyanic acid in aqueous solution to produce the corresponding alkylene cyanohydrin. After the reaction is completed, the amine can be removed by distillation along with the water forerun and again used in subsequent runs. In some cases with secondary members of this particular class of amines, a partial conversion of secondary to tertiary amine occurs during the formation of the alkylene cyanohydrin by addition of the oxide to the secondary amine. For example, di-isopropyl amine will react in part with ethylene oxide to form di-isopropyl β-hydroxyethyl amine. However, the thus formed tertiary amine will not react further with the alkylene oxide to form a quaternary base, and consequently a mixture of the secondary and tertiary amine will function as the catalyst and can be recovered by distillation and employed in a following run.

This new improved process using the amine catalyst is simple, economical and easily operated, and eliminates the filtration, neutralization and washing steps required in recovering the akylene cyanohydrin in the above disclosed prior art process employing the alkaline earth metal compounds as catalysts.

The above class of amines which will be referred to hereinafter as sterically hindered amines include the secondary aliphatic amines having at least two of the hydrogen atoms on the carbon atoms attached to the nitrogen replaced by low molecular weight alkyl radicals, and tertiary amines in which at least two of the carbon atoms attached to the nitrogen have at least two of the attached hydrogens replaced by low molecular weight alkyl radicals.

These preferred amines may be represented by the general formula

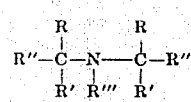

in which R and R' represent alkyl radicals having not more than four carbon atoms, R" represents a member of the group consisting of hydrogen and an alkyl radical having not more than four carbon atoms, and R''' represents a member of the group consisting of hydrogen, a hydroxyalkyl and an alkyl radical having not more than four carbon atoms.

Typical examples of the above class of amines are:

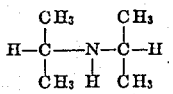

Di-isopropyl amine

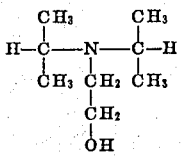

Di-isopropyl β-hydroxyethyl amine

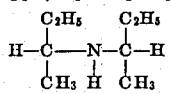

Di-sec. butyl amine

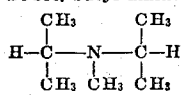

Methyl di-isopropyl amine

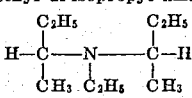

Ethyl di-sec. butyl amine

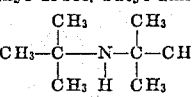

Di-tertiary butyl amine

Although somewhat lower or higher temperatures can be used successfully, the preferred operating temperature for the reaction of an alkylene oxide with hydrocyanic acid in the present process is in the range of from about 50 to 100° C.

The present process employing the sterically hindered amine catalysts also has the distinct advantage in that it can be operated continuously using an alkylene cyanohydrin-water mixture as a diluent. Thus, for example, a mixture of ethylene cyanohydrin and water, containing say approximately 75% cyanohydrin, is circulated through a series of reaction tubes maintained at the desired reaction temperature. A mixture of ethylene oxide, hydrocyanic acid, water and amine catalyst in the proper ratio is fed into the circulating system and the crude reaction product withdrawn continuously. The crude product then passes to a distillation unit where the amine catalyst and water are separated from the higher boiling cyanohydrin. Some of the amine catalysts are substantially insoluble in water, and hence the aqueous distillate stratifies into an upper amine layer and a lower water layer. The amine layer may then be removed and returned to the cycle. Where the amine is soluble in water, recovery may be attained by redistillation. Alternately, the aqueous distillate of amine and water may be returned to the cycle as the catalyst solution.

The accompanying flow sheet illustrates a preferred method of carrying out the invention.

The following examples in which the parts are by weight further illustrate the invention.

*Example 1*

15 parts of di-isopropyl amine were added to 118 parts of water. A mixture consisting of 220 parts of ethylene oxide and 137.7 parts of hydrocyanic acid were then slowly added to the aqueous solution, the reaction temperature being maintained between 60–65° C. by cooling as required. After the addition of the reactants was completed, the solution was allowed to stand for 1 hr. at 60–70° C., and then distilled first at atmospheric pressure in order to remove the catalyst and water, and then at reduced pressure in order to distill the ethylene cyanohydrin. 337 parts of pure ethylene cyanohydrin were obtained, representing a 95% yield. In this run, the amount of water used was such that after all the hydrocyanic acid and ethylene oxide were reacted, there were present approximately 74% ethylene cyanohydrin and 26% water.

*Example 2*

9 parts of di-isopropyl amine were added to 212 parts of water. A mixture of 264 parts of ethylene oxide and 165 parts of hydrocyanic acid were then slowly added to the aqueous solution, the reaction temperature being maintained between 60–70° C. by cooling as required. After the addition of the reactants was completed, the solution was allowed to stand for 1 hr. at 60–70° C., and then fed to a continuously operated stripping column in which the catalyst and water were separated from the higher boiling cyanohydrin. The yield of pure ethylene cyanohydrin obtained in this run was 97.7% of the theoretical.

*Example 3*

A mixture consisting of 75 parts of ethylene cyanohydrin, 25 parts of water and 2 parts of di-isopropyl amine were continuously circulated through a series of steel tubes held at a temperature of from 80–85° C. To this circulating solution, a mixture consisting of 44 parts of ethylene oxide, 27.5 parts of hydrocyanic acid, 1.9 parts of di-isopropyl amine and 23.6 parts of water was added continuously by means of feed pumps. The reaction product was withdrawn from the circulating system and passed to a distillation column where the catalyst and water were continuously removed from the cyanohydrin and returned to the cycle. The yield of ethylene cyanohydrin was 96%.

*Example 4*

17.4 parts of di-secondary butyl amine were added to 142 parts of water. A mixture consisting of 264 parts of ethylene oxide and 165 parts of hydrocyanic acid was then added slowly with stirring to the aqueous solution, the reaction temperature being maintained between 60–65° C. The reaction mixture after standing at 60–70° C. for 1 hr., was fed to a continuously operated stripping column in order to separate the catalyst and water from the higher boiling cyanohydrin. The yield of pure ethylene cyanohydrin was 95.4%.

*Example 5*

9.7 parts of di-secondary butyl amine were added to 85 parts of water. A mixture consisting of 174 parts of propylene oxide and 82.6 parts of hydrocyanic acid was then added slowly with stirring to the aqueous solution, the reaction temperature being maintained at 60–70° C. throughout the addition. The resulting mixture, after standing for about ½ hr. at the above temperature, was then distilled, first at atmospheric pressure in order to remove the catalyst and water, and thereafter under reduced pressure to distill the higher boiling propylene cyanohydrin. The yield of propylene cyanohydrin thus obtained was 94% of the theoretical.

Example 6

21.5 parts of di-isopropyl β-hydroxyethyl amine were added to 142 parts of water. A mixture consisting of 264 parts of ethylene oxide and 165 parts of hydrocyanic acid was then added slowly to this solution with stirring, the reaction temperature being maintained between 60–65° C. by cooling. The reaction mixture after standing for 1 hr. at 60–70° C., was fed to a continuously operated stripping column in order to separate the amine and water from the ethylene cyanohydrin. The yield of ethylene cyanohydrin was 94%.

Example 7

11.5 parts of di-isopropyl ethyl amine were added to 212 parts of water. A mixture of 264 parts of ethylene oxide and 165 parts of hydrocyanic acid was then added with stirring while the reaction temperature was maintained between 60–65° C. by cooling. The reaction mixture, after standing at 60–70° C. for 1 hr., was fed to a continuously operated stripping column in order to separate the amine catalyst and water from the ethylene cyanohydrin. The yield of pure ethylene cyanohydrin thus obtained was 97.6%. This amine being substantially insoluble in water, the water-amine distillate separated into two layers, an upper amine layer and a lower water layer. The amine was removed and employed as the catalyst in a subsequent run.

Example 8

The procedure of Example 7 was repeated using 10.3 parts of di-isopropyl methyl amine in place of the di-isopropyl ethyl amine. The yield of ethylene cyanohydrin was 93% of the theoretical.

While the invention has been described with particular reference to specific embodiments, it is to be understood that it is not to be limited thereto but is to be construed broadly and restricted solely by the scope of the appended claims.

I claim:

1. A method of producing an alkylene cyanohydrin which includes the steps of reacting together an alkylene oxide and hydrocyanic acid in aqueous solution in the presence of a sterically hindered amine catalyst, simultaneously removing the amine catalyst and water, and subsequently recovering the thus formed alkylene cyanohydrin.

2. The method of claim 1 in which the reaction is carried out at a temperature within the range of from about 50–100° C.

3. The method of claim 1 in which the catalyst is di-isopropyl amine.

4. The method of claim 1 in which the catalyst is di-secondary butyl amine.

5. The method of claim 1 in which the catalyst is di-isopropyl β-hydroxyethyl amine.

6. A method of producing ethylene cyanohydrin which includes the steps of reacting together ethylene oxide and hydrocyanic acid in aqueous solution in the presence of a sterically hindered amine catalyst, simultaneously removing the amine catalyst and water, and subsequently recovering the thus formed ethylene cyanohydrin.

7. A method of producing ethylene cyanohydrin which includes the steps of reacting together ethylene oxide and hydrocyanic acid in aqueous solution in the presence of a sterically hindered amine catalyst, simultaneously removing the amine catalyst and water, subsequently recovering the thus formed ethylene cyanohydrin, and recycling the amine catalyst.

8. A method of producing ethylene cyanohydrin which includes the steps of continuously feeding ethylene oxide, hydrocyanic acid, a sterically hindered amine catalyst and water to a reaction zone maintained at a temperature within the range of from about 50 to 100° C., continuously removing the resulting reaction mixture, simultaneously removing the catalyst and water from said mixture, subsequently recovering the thus formed ethylene cyanohydrin, and continuously returning the recovered catalyst to the cycle.

ERWIN L. CARPENTER.

REFERENCES CITED

The following references are of record in the file of this patent:

UNITED STATES PATENTS

| Number | Name | Date |
|---|---|---|
| 2,364,422 | Brooks | Dec. 5, 1944 |
| 2,390,519 | Davis et al. | Dec. 11, 1945 |

FOREIGN PATENTS

| Number | Country | Date |
|---|---|---|
| 359,262 | Great Britain | Oct. 22, 1931 |

OTHER REFERENCES

Erlenmeyer, Liebig's Annalen, vol. 191, pp. 261–285 (1878).